April 27, 1965
H. A. NELSON ETAL
3,180,404
COOLING ELECTRONIC HEAT PRODUCING ELEMENTS AND THE LIKE
Filed Dec. 2, 1959
2 Sheets-Sheet 1
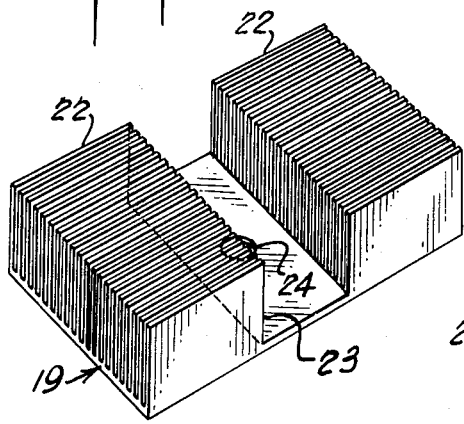
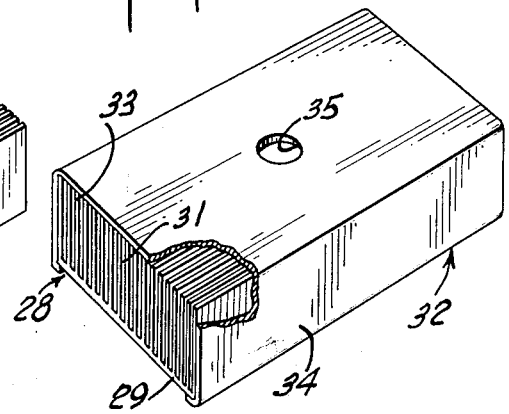
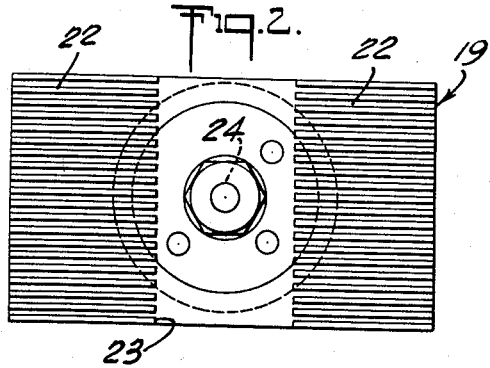
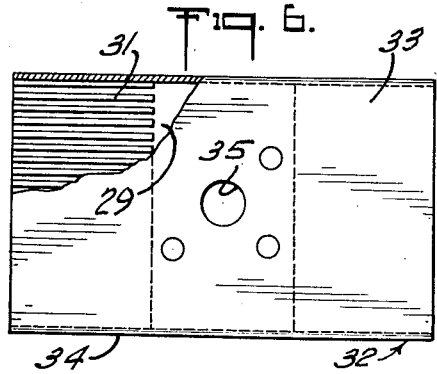
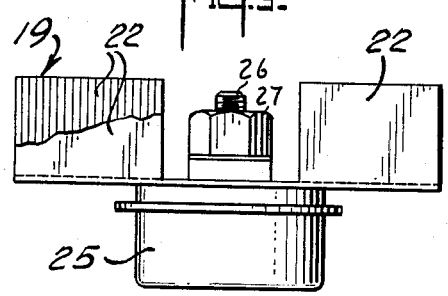
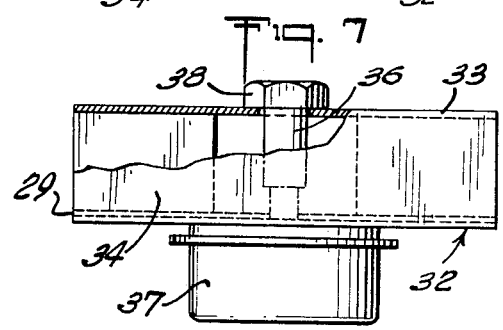
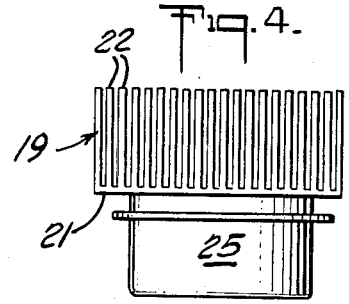
INVENTORS
HARRY A. NELSON
HOWARD R. OTTO
BY
Their ATTORNEY

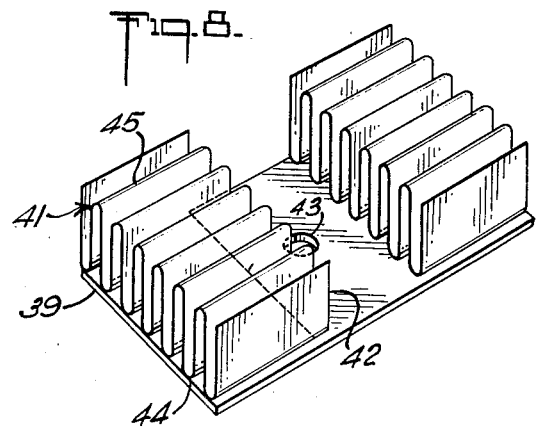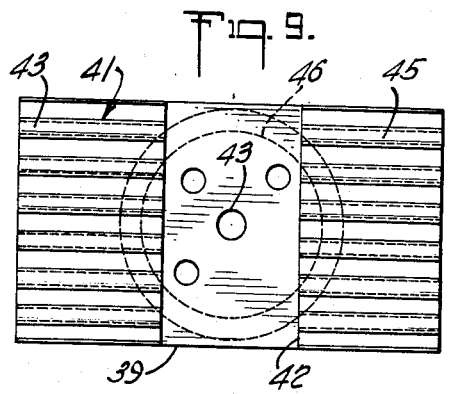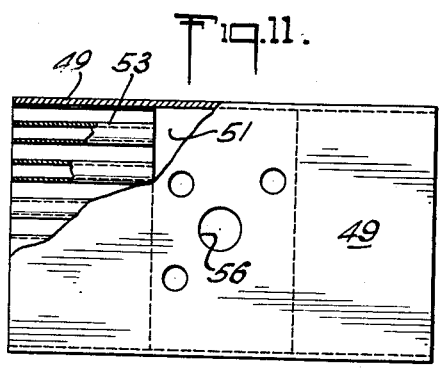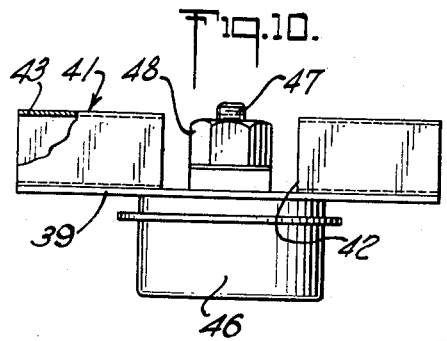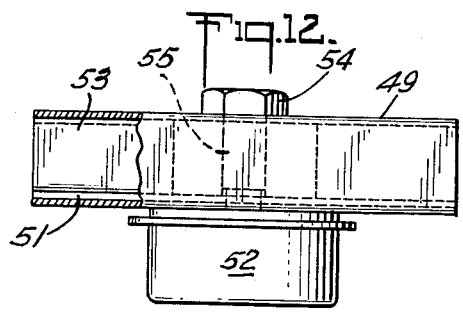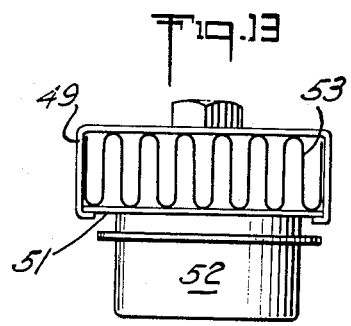

United States Patent Office 3,180,404
Patented Apr. 27, 1965

1

3,180,404
COOLING ELECTRONIC HEAT PRODUCING ELEMENTS AND THE LIKE
Harry A. Nelson, Los Angeles, Calif., and Howard R. Otto, Kettering, Ohio, assignors to United Aircraft Products, Inc., Dayton, Ohio, a corporation of Ohio
Filed Dec. 2, 1959, Ser. No. 856,757
5 Claims. (Cl. 165—47)

This invention relates to heat transfer devices to be mounted on and form a part of articles of a heat producing nature, particularly articles of electrical equipment such as transistors, diodes, tubes, resistors, and rectifiers.

An object of the invention is to provide a heat transfer attachment for articles as described facilitating the carrying off of generated heat, the devices being adapted for heat dissipation through natural or forced convection and conduction in either ducted or nonducted installations.

Another object of the invention is to provide a device of the kind described having an adaptation to existing heat producing articles as well as lending itself to integrated construction as an original part thereof.

Other objects and structural details of the invention will appear from the following description when read in connection with the accompanying drawings, wherein:

FIG. 1 is a view in perspective of a heat transfer device in a first illustrated embodiment of the invention;

FIG. 2 is a top plan view of the embodiment of FIG. 1, a heat producing element and the means for mounting the heat transfer device to such element being added, along with wire passing openings;

FIG. 3 is a view in side elevation of the assembly as shown in FIG. 2;

FIG. 4 is an end view of the assembly of FIG. 2;

FIG. 5 is a view in perspective showing the device of FIG. 1 with a cover thereover to provide for ducted flow of a coolant over the heat transfer device;

FIG. 6 is a top plan veiw, partly broken away, of the embodiment of FIG. 5 with wire passing openings added;

FIG. 7 is a veiw in side elevation, partly broken away, of the device of FIG. 5, showing the mounting to the heat producing element;

FIG. 8 is a view in perspective of a heat transfer device in a further illustrated embodiment of the invention;

FIG. 9 is a top plan view of the device of FIG. 8, wire holes being added and the heat producing element being diagrammatically shown;

FIG. 10 is a view in side elevation of the device of FIG. 8, the heat producing element and the mounting means being shown;

FIG. 11 is a top plan view, partly broken away, of a device in accordance with the FIG. 8 embodiment having a cover plate, with wire passing holes therein installed thereon for ducted flow of a coolant;

FIG. 12 is a view in side elevation, partly broken away, of the FIG. 11 embodiment, a heat producing element and mounting means being shown; and FIG. 13 is an end view of the assembly of FIG. 12.

Referring to the drawings, all of the several illustrated embodiments of the invention are constructed and arranged for mounting to small size, individual pieces of electronic equipment and function to achieve a more facile and effective removal of heat from the surface thereof.

FIGS. 1 to 13 illustrate plate type heat transfer devices constructed and arranged for mounting to electronic heat producing elements. In the case of the embodiment of FIG. 1 to FIG. 4, the device includes a rigid heat conductive part 19 which is machined or otherwise formed to provide a bottom plate 21 from which extend vertical parallel fins 22, the fins 22 being formed in two spaced groups separated by a transverse channel or open space 23. Extending vertically through the plate 21 in the space 23 is an opening 24. The plate 21 is adapted to seat on the heat producing element casing 25 with a screw stud 26 passing from the casing upward through the opening 24 where a nut 27 is applied thereto and holds the finned structure 19 and the heat producing element in an assembled relation. Types of fasteners other than the stud-nut combination 26–27 are of course possible.

The fins 22 provide extended surface of substantial area for a dispersion of conducted heat to the surrounding cooling medium. The parallel spaced relation of the fins 22 lends itself to a forced movement of a fluid coolant longitudinally of the fins, with the space 23 serving as a redistribution or mixing chamber inhibiting straight through flow. The central location of the mounting for the casing 25 provides for an even distribution of heat and for an equal heat transfer effect irrespective of the direction of coolant flow from end to end of the finned structure.

FIGS. 5 through 7 disclose a finned structure 28 providing a plate 29 and fins 31 which is the same as the structure 19, with the addition thereto of a cover 32. The latter has a top portion 33 which lies in superposed relation to the lower plate 29 in contacting relation to the upper surfaces of the fins 31. Side portions 34 of the cover are turned down over the sides of the finned structure with the extremities thereof bent inward to underlie the plate 29. In the upper plate portion 33 is an opening 35 which in this illustrated embodiment of the invention receives a relatively elongated stud 36 extending from the heat producing element 37 and having a nut 38 externally applied thereto. The cover 32 defines with the plate 29 a duct for a confined flow of coolant along the fins 31.

The embodiment of FIGS. 8 to 10 is like that of FIGS. 1 to 4 except for the use of nonintegral fins. In this instance, as shown, a plate 39 of heat conductive material has strip fins 41, also made of heat conductive material, mounted thereon spaced apart across a transverse gap 42 with the plate 39 having a through opening 43. The fins 41 are made of thin ductile sheet material gathered in an undulating configuration to provide lower surfaces 44 and upper surfaces 45 extending longitudinally of the plate 39. Surfaces 44 contact the plate 39 and are secured thereto in a suitable manner, as by brazing for a good heat transfer path. The fins 41 accordingly provide extended heat transfer surface in the same manner as the fins 22 with the heat being dissipated by conduction and convection as air or another cooling fluid passes over the fins. The plate 39 is adapted to be mounted upon a heat producing element casing 46 through the cooperation of a stud 47 extending upward through the opening 43 with an applied nut 48.

FIGS. 11 through 13 disclose a modified form of the device of FIG. 8, the modification taking the form of installation of a cover plate 49 corresponding to the cover plate 32 of FIG. 5. Thus, this inventive embodiment comprises a plate 51 mounted upon a heat producing element 52 to conduct heat therefrom, undulating fin strips 53 brazed or otherwise secured to the upper surface of plate 51, the cover plate 49 contacting the upper surfaces of the fin strips and a nut and stud combination 54 and 55. The cover 49 cooperates with the plate 51 in the defining of a duct for a confined flow of coolant over the fin strips 53. The extension of the stud 55 through the cover 49 is by way of an opening 56 therein.

What is claimed is:
1. A cooling plate serving as a mount for a heat producing element and constructed for facile dissipation of produced heat, including a plate formed with opposite ends and having groups of projected fins, said groups being in opposed spaced apart relation and the fins of each group being in spaced parallel relation to define flow passes therebetween opening through respective ends of the plate and into the space between said groups, said plate having in the space between said groups of fins means for installing said heat producing element therein.

2. A cooling plate according to claim 1, characterized in that said fins are formed as an integral part of said plate, the heat producing element including connector means installed through said plate between said groups of fins.

3. A cooling plate according to claim 2, characterized by a cover in superposed relation to said groups of fins and defining with said plate a duct for fluid flow therethrough lengthwise of said fins, said connector means extending between and interconnecting said plate and said cover.

4. A cooling plate according to claim 1, characterized in that said fins have the form of longitudinally spaced apart strips of a flexible foil-like material arranged in undulating fashion, said heat producing element including connector means installed through said plate between said spaced apart fin strips.

5. A cooling plate according to claim 4, characterized by a cover in superposed relation to said fin strips and contacting the upper surfaces thereof, said cover defining with said plate a duct for fluid flow therethrough lengthwise of said fin strips, said connector means extending between and interconnecting said plate and said cover.

References Cited by the Examiner

UNITED STATES PATENTS

| | | | |
|---|---|---|---|
| 2,435,170 | 1/48 | Wachs et al. | 165—136 X |
| 2,566,310 | 9/51 | Burns et al. | 165—140 |
| 2,751,199 | 6/56 | Williams | 165—147 |
| 2,958,515 | 11/60 | Booher | 165—80 |
| 2,965,819 | 12/60 | Rosenbaum | 317—234 |
| 2,984,774 | 5/61 | Race | 317—324 |

CHARLES SUKALO, *Primary Examiner.*

HERMAN BERMAN, HERBERT L. MARTIN, EUGENE F. BLANCHARD, FREDERICK L. MATTESON, Jr., PERCY L. PATRICK, *Examiners.*